United States Patent [19]

Heerten et al.

[11] Patent Number: 5,041,330

[45] Date of Patent: Aug. 20, 1991

[54] WATER AND/OR OIL-IMPERMEABLE SEALING MAT CONSISTING SUBSTANTIALLY OF A SUBSTRATE LAYER, A LAYER OF SWELLABLE CLAY AND A COVER LAYER

[76] Inventors: George Heerten, Kaiserstr 15, D-4990 Lubbecke 1, Fed. Rep. of Germany; Karsten Johannben, Wehe 212, D-4993 Rahden, Fed. Rep. of Germany; Volkhard Muller, Destel 146, D-4995 Stemwede 1,, Fed. Rep. of Germany

[21] Appl. No.: 412,803

[22] Filed: Sep. 27, 1989

Related U.S. Application Data

[63] Continuation-in-part of Ser. No. 155,506, Feb. 12, 1988.

[30] Foreign Application Priority Data

Feb. 13, 1987 [DE] Fed. Rep. of Germany ....... 3704503

[51] Int. Cl.$^5$ .......................... B32B 5/06; B32B 5/16; B32B 5/22; B32B 19/06
[52] U.S. Cl. .................................... 428/213; 428/220; 428/234; 428/240; 428/241; 428/283; 428/300; 428/332; 405/38; 405/107; 405/109; 405/115
[58] Field of Search ............... 428/240, 283, 225, 234, 428/241, 70, 454, 330, 331, 213, 220; 405/107, 109, 115, 38

[56] References Cited

U.S. PATENT DOCUMENTS

| | | | |
|---|---|---|---|
| 3,186,896 | 6/1965 | Clem | 405/107 X |
| 3,630,762 | 12/1971 | Olton et al. | 405/107 X |
| 4,209,568 | 6/1980 | Clem | 405/107 X |
| 4,250,172 | 2/1981 | Matzenberg et al. | 428/234 |
| 4,424,248 | 1/1984 | Tesch et al. | 428/240 X |
| 4,501,788 | 2/1985 | Clem | 428/240 |
| 4,656,062 | 4/1987 | Harriett | 428/283 X |

Primary Examiner—Jenna Davis
Assistant Examiner—Terrel Morris
Attorney, Agent, or Firm—Larson and Taylor

[57] ABSTRACT

A water and/or oil-impermeable sealing mat is provided in form of a bentonite non-woven fabric combination with the possibility of transmitting thrust from one batt layer to the other, i.e. on a slope thrust forces can be transmitted by the covering batt material through the layer of swellable clay into the supporting batt material. Such a sealing mat is a fiber-reinforced mineral seal permitting the transmission of thrust forces on slopes, without the risk of the layer of swellable clay itself becoming the preferred sliding plane. The sealing mat consists of a non-woven textile material as substrate layer, a layer of swellable clay, preferably sodium bentonite, and a cover layer consisting preferably also of a non-woven textile material, all three layers having been needled together in the conventional manner in a needle loom. When moistened, the clay swells and forms the water and/or oil-impermeable layer. The water and/or oil-impermeable sealing mat is used especially in hydraulic engineering and in waste disposel engineering.

13 Claims, 1 Drawing Sheet

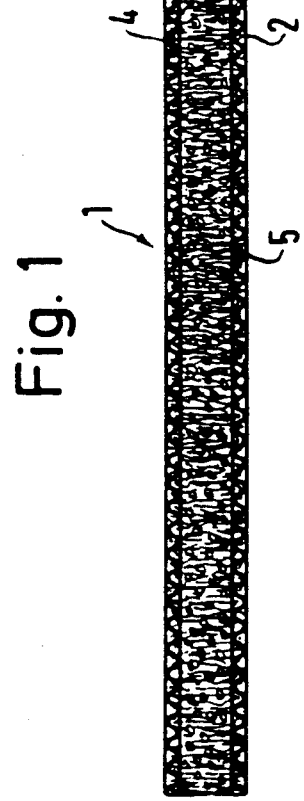
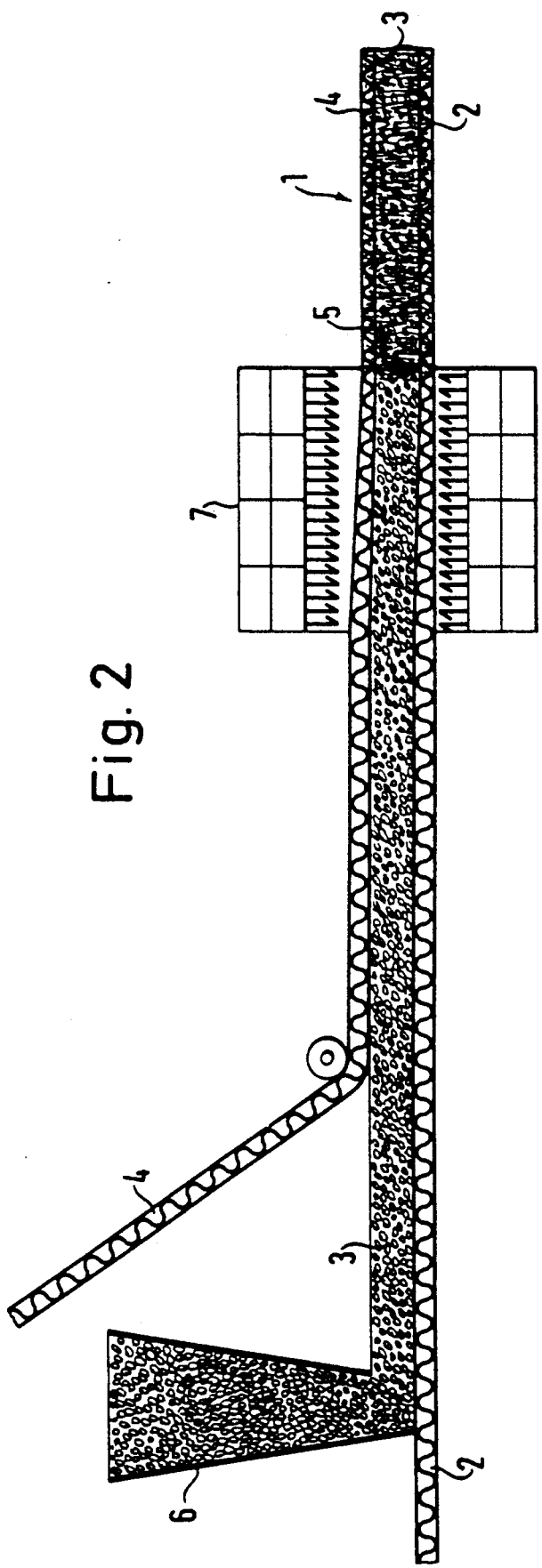

WATER AND/OR OIL-IMPERMEABLE SEALING MAT CONSISTING SUBSTANTIALLY OF A SUBSTRATE LAYER, A LAYER OF SWELLABLE CLAY AND A COVER LAYER

This application is a continuation-in-part of application Ser. No. 07/155,506 filed Feb. 12, 1988.

The present invention relates to a water and/or oil-impermeable sealing mat and more particularly to a water and/or oil-impermeable sealing mat particularly suitable as a water and/or oil-barrier for hydraulic engineering, for environmental pollution control for the building of ponds, lagoons, as a soil sealant for hazardous or nuclear waste or for the retention of animal waste as for example, on farms, and such other uses as will become apparent to those skilled in the art upon reading the following description.

Said water and/or oil-impermeable sealing mat consists of a flexible substrate layer, a layer of swellable clay, preferably bentonite, and a flexible cover layer.

In the past, bentonite was widely used in various forms to act as a water barrier. So it is already known to provide seepage resistant structures by employing a mass of swellable bentonite across the path of possible seepage or flow. One such method and composition for impeding the seepage or flow of water is disclosed in U.S. Pat. No. 2,277,286 (Bechtner). As therein more fully described, commercial bentonite is used to block leakage or flow of water seepage, and structures of various types are safeguarded against leakage by blocking the path of flow of the water with bentonitic or highly colloidal clay which possess the capacity to swell and gelatinize upon contact with water. One of the clays found best suited for this purpose was the true bentonite obtained in regions of Wyoming and South Dakota, although other highly colloidal, or bentonitic clays which possess the property of swelling and gelatinizing in water to a substantial degree are also useful.

Further in the past, finally divided bentonite was fabricated into a laminate with water absorbent paper sheeting as described for example in the U.S. Pat. Nos. 4,048,373, 4,070,839 and 4,139,588. Such laminates are especially developed for use as a water barrier and are made from corrugated paperboard sheets.

The channels in said corrugated paperboard sheets are filled with finely divided bentonite. When such pannel is placed at the bottom of the pond and is exposed to water, the water passes through the top layer of kraft paper and is adsorbed into the bentonite material. At the same time the paper loses its tensile strength due to the wetting process. The bentonite has the capacity to expand and swell in response to absorbing the water. This expansion of bentonite and the loss of tensile strength of the kraft paper cause that the bottom sheet member and the cover sheet member to not longer hold together.

Another way to package bentonite material in sheets or rolls, which can be placed on the bottom of the pond or lagoon so as to form a waterproof barrier thereon, is disclosed in U.S. Pat. No. 4,501,788 (corresponding to European Patent 8 059 625). In said Patent is described a method for providing such a packaged bentonite sheet material utilized the following process steps:

(a) Using a support polyester sheet material (for example a porous non-woven fabric) having the ability to permit gases to escape therethrough in a lateral direction.

(b) Applying an adhesive to the upper surface of this sheet material, the adhesive being formed from a starch-like glue.

(c) Applying approximately one-fourth inch of bentonite on top of the adhesive.

(d) Spraying a second coat of adhesive over the top of the bentonite.

(e) Placing a scrim or fine mesh material on top of the adhesive.

(f) Press rolling the above combination into a elongated flat sheet material.

(g) Baking the sheet material in a long oven at approximately 300° F. so as to bake all the moisture out of the sheet material and the bentonite.

Not only is the above process cumbersome, expensive and time consuming, but also the support sheet and the cover sheet lose their stick firmly contact with each other. This is a very important disadvantage, because the bentonite layer acts in a wet condition like a sliding path on the sides of the pond or other places. This sliding effect is further enhanced by the dissolved adhesive in the wet condition.

Therefore other people tried by a further development to avoid at least one of the before mentioned shortcomings, that means to avoid the use of an adhesive and the necessary baking process by using such an adhesive. Such a new process which does not require baking or adhesive as above mentioned is disclosed in the U.S. Pat. No. 4,565,468. The process of said patent involves the use of the following steps:

(a) Using a flat polyester sheet material, preferably a synthetic non-woven fabric which is a porous, flexible poly propylene material. The sheet material is capable of dissipating gas in a lateral direction so as to permit gas which gathers adjacent the sheet material to pass laterally outwardly through the sheet material.

(b) Applying approximately one-fourth inch of bentonite over the top of the base material.

(c) Applying plain kraft paper or other biodegradable material over the top of the bentonite. This material must be capable of degrading after hydration.

(d) Stitching the sheet material to the base material with the bentonite being positioned between the two sheets of material. In the preferred form the stitches extend in crossing diagonal lines with respect to the longitudinal axis of the sheet material so as to form diamond shaped quilted compartments between the upper sheet material and the base sheet material. The quilted compartments contain bentonite therein. The quilted arrangement prevents the bentonite from shifting during the rolling of the quilted material and during transportation. In another form the kraft paper is corrugated so as to form elongated corrugated compartments for containing the bentonite material.

When the above material is placed within a water environment, such as at the bottom of a pond or lagoon, the bentonite expands and breaks the kraft paper layer at the top of the barrier. The bentonite continues expanding so as to cover the stitch holes formed by the stitching, and thereby forms a water impervient layer.

As seen from the above description it may be that the process for the production of the sheet material according to the U.S. Pat. No. 4,565,468 is better than according to the process of the U.S. Pat. No. 4,501,788 (corresponding to European Patent 0 059 625), but there is still the large disadvantage that the bentonite layer during the use as a water barrier in a wet condition acts like a sliding path on slopes.

All of the sealing mats described in the above U.S. patents serve merely to "package" bentonite and always consist in principle of a substrate layer, an bentonite layer and a cover layer. After these sealing mats have been laid out and subsequently moistened, the substrate and cover layers are connected only via the swollen bentonite layer therebetween, which has the consistency of grease. Now if it is considered that the sealing mats must further be weighted down with a sand or soil filling and then with gravel or rocks not only on flat surfaces, but also on slopes, it is easily conceivable that such a filling on the swollen intermediate bentonite layer, which acts like a slide, slips off, which is often observed in practice.

Thus, in principle, the sealing mats described in the above-given U.S. patents—as already indicated—serve only to pack the bentonite in flat form, such that the cover layer disconnects from the substrate layer upon the swelling of the bentonite and a continuous bentonite layer takes shape.

However, in reality such a bentonite layer can be produced more simply and inexpensively in situ in the manner described in the U.S. Pat. No. 4,344,722. Said patent provides a method and a system for waterproofing a desired substrate and further contemplates a waterproof and chemical-resistant product. The method comprises providing a length of flexible moisture-permeable thin, synthetic sheet material having desired characteristics, placing in contact with the substrate to be waterproofed a layer of the material, covering the layer of material with a central layer of bentonite (Montmorillonite clay) and placing on top of the bentonite a third layer of the fabric. The flexible moisture-permeable thin, synthetic sheet material is typically a non-woven fabric.

Therefore, a primary object of the present invention is to provide a water and/or oil-impermeable sealing mat containing a swellable clay, preferably bentonite, said sealing mat being constructed such that in practical application on slopes it can transfer thrust forces caused by the sand and rock loads from the upper cover layer through the swollen intermediate bentonite layer directly onto the substrate layer. In other words, the water-impermeable sealing mat according to the invention should be securely bonded even after the swelling of the bentonite, to prevent the sand or gravel filling weighted down with gravel or rocks from sliding off.

Starting from this already inventive task, a further object of the present invention is to provide such a water and/or oil-impermeable sealing mat, which can be easily and economically manufactured and mass produced.

A still further object of the present invention is to provide a water and/or oil-impermeable sealing mat, which can be manufactured in varying thickness for different applications as a water barrier, which prevents the seepage of water and/or the leaching of contaminants from ponds, reservoirs, dams, municipal and industrial waste lagoons or the like.

These objects are realized according to the present invention by a water and/or oil-impermeable sealing mat which is produced by applying on the substrate layer the dry powdered or granular swellable clay, placing the cover layer thereon, wherein the substrate and the cover layer consist of non-woven textile material and the layer optionally not consisting of non-woven textile material consists of woven or knitted fabric, and passing the resulting triple layer material through a needle loom in order to needle the substrate layer and the cover layer together.

At this point it must be mentioned that it has long been known to needle granular or powdery materials between two non-woven textile materials. For example, as early as 1973, in the German laying-open specification 23 27 618, the applicant described a large-area, multi-layered drainage element for underground construction, with large surface dimensions, low weight and low construction height, wherein a granular material is needled in between two non-woven textile materials. The two non-woven textile materials were interconnected using known needling techniques. Corresponding forms, albeit for filtering purposes, are also described in the U.S. Pat. Nos. 4,424,248 and 4,250,172. For example, according to the method described in the U.S. Pat. No. 4,424,248, fibers, granulates or powders are needled in between two non-woven textile materials. In the manufacture of such drainage elements or filter elements, first of all, the granulate or powder layer is applied to the support layer and then the cover layer of fleece material, i.e. a layer of needle-punchable fibers, is applied to the granulate or powder layer. These needle-punchable fibers are engaged by downwardly directed barbs arranged laterally of the shaft of the needle which are used for instance during the fabrication of needle felt. The fibers which are thus engaged by the needle during needle punching are deflected in a direction perpendicular to the plane of the surface of the cover layer. This requires a certain strength and pliability of the fibers, and in the case of fibers an adequate staple length, in the case of endless filaments, for instance a deposition in the form of loose loops or coils, so that such loops can be downwardly drawn by the barbs without tearing the filaments.

As is known from the needle felting art a multiplicity of needles simultaneously carry out a needle puncturing operation and throughout a number of successive strokes, so that there results for instance a stitch density of 60 stitches per $cm^2$ from the side of the cover or top layer into the support layer. The barbs of the needles, upon passage through the cover layer, tear along individual fibers or entire clusters of holding fibers and partially orient them to a point past the support layer. Upon retraction of the needle the holding fibers are stripped off of the barbs. The holding fibers then for the most part remain anchored over part of their length in the cover layer, whereas another part of the length of the same fibers is fixedly retained by the support layer. Owing to the multiplicity of needle stitches there are drawn-in such holding fibers at numerous locations distributed over the entire surface. Consequently, there are thus held together the support layer and the cover layer. On the other hand, the layer of grains or particles has drawn therethrough numerous fibers, so that the grains or particles are prevented from any lateral shifting in the plane of the surface of the article. The particles are embedded in a loosened form between the holding fibers. These holding fibers hold together the layers.

Although, as the above statements show, it has been known for years to needle granular or powdery materials between two layers of non-woven material, up to now no one has attempted to needle bentonite in for the purposes of the present invention. The reason for this can probably be found in the fact that, due to the enormous swelling capability of bentonite (on absorbing water, bentonite swells to 10 to 20 times its dry volume) it was assumed that the fibers projecting only into the substrate layer would not withstand the enormous swelling pressure thereby arising, i.e. that the fibers would be pulled back out of the substrate layer by the swelling bentonite. However, this would mean that the main object of the present invention could not be realized, according to which the substrate layer and the cover layer are to remain securely connected during and after the swelling of the swellable clay as well, in order on the one hand to build up a counterpressure to the swelling, guaranteeing a denser packing of the swollen clay particles, and on the other hand to guarantee the transmission of the thrust force from cover layer to substrate layer and not to impede this transmission in any way by the very low friction coefficients of the swollen clay.

Therefore, the invention is not based on the idea of introducing bentonite between two non-woven fabric sheets and thereafter needling the non-woven sheets one to the other only for the purpose of packing bentonite between two layers. Furthermore, the present invention is directed to a bentonite non-woven fabric combination with the possibility of transmitting thrust from one batt layer to the other, i.e. on a slope thrust forces can be transmitted by the covering batt material through the bentonite layer into the supporting batt material. The present invention relates to a fiber-reinforced mineral seal permitting the transmission of thrust forces on slopes, without the risk of the bentonite layer itself becoming the preferred sliding plane. Products used heretofore require particularly tenacious supporting inlays for use on slopes to direct the thrust forces above the bentonite layer toward the upper edge of the slope. There said products have to be secured in an anchoring ditch. In our invention this is not necessary, since thrust forces can be transmitted through by the fiber-reinforced seal, as mentioned before.

A further problem underlying the invention was to effect fiber interlocking by needling between supporting and covering layer in such a way that also after swelling of the bentonite the fiber coherence between cover layer and supporting layer remains intact for transmitting thrust. In this connection it is pointed out once more that, in swelling, bentonite increases its volume by 10 to 20 times. The thereby occurring swelling pressure let the expert presume that such swelling pressure would separate the fiber batts one from the other. However, this, surprisingly, is not so, and it can be said that the present invention has overcome a prejudice that had existed among those skilled in the art.

The present invention overcomes this prejudice and provides a water and/or oil-impermeable sealing mat for use as a water and/or oil barrier consisting substantially of a substrate layer, a layer of swellable clay, and a cover layer, wherein
  (a) the substrate and/or the cover layer consist(s) of non-woven textile material, and the layer optionally not consisting of non-woven textile material consists of woven or knitted fabric,
  (b) all three layers are bonded together by needling,
  (c) the swellable clay is at least partially embedded in a non-woven textile layer and
  (d) the thickness of the swellable clay is less than or at least not substantially greater than that of the non-woven textile layer(s) as a whole.

The non-woven textile materials have preferably an area weight of about 250 to about 1000 g/m², a thickness of about 2 to about 8 mm, effective opening sizes between about 0.08 and about 1.5 mm, water permeabilities at a load of 2 kN/m² between about $10^{-3}$ and about $10^{-2}$ m/s and are made of spinning fibers with a length of cut of about 60 to about 150 mm, preferably of about of 120 to about 150 mm.

About 30 to about 50% of the employed clay, especially if finely powdered bentonite is used, is located in the substrate and/or the cover layer.

For example, one of the sealing mats according to the present invention has the following characteristics:
  1. Sheet thickness of the bentonite layer dry: about 2 mm after 3 hours storage in water: about 8 mm

| 2. Sheet thickness of the bentonite mat (mm) | | |
| --- | --- | --- |
| load | dry | after 3 hrs' storage in water |
| 2 kN/m² | 9.9 | 14.9 |
| 20 kN/m² | 8.9 | 13.9 |

3. Also in wet (swelled state there still exists a very good bond between supporting batt material and covering batt material.
  4. Preferably fibers of 120 mm to 150 mm length are employed.
  5. The needle punching through the bentonite layer results in a fiber-reinforced bentonite mat which enables a transfer of shear stresses to the bentonite layer (from the top side of the bentonite mat to the bottom or the other way round). The shear stresses have been determined in a shearing test at a load of 200 kN/m² with 120 nN/m².

Preferably both the substrate layer and the cover layer consists of non-woven textile material. However, also a structure may be desirable in which the substrate layer consists of non-woven textile fabric and the cover layer consists of woven or knitted textile fabrik, or the cover layer constists of non-woven textile fabric and the substrate layer constists of woven or knitted fabric.

The non-woven textile fabrics employed preferably consists of high grade synthetic resin fibers, especially of polyethylene, polypropylene, polyester and polyacrylic and/or polyamide fibers. For use in waste disposal engineering non-woven textile materials made from high density polyethylene (HDPE) are especially preferred.

Such non-woven fabrics are absolutely resistant to rotting (resistant to all substances occuring in bodies of water and in soil) and thus warrant evidently an extremely long service life. Their extraordinarily high tear strength provides substantial resistance to mechanical wear. They are highly stable toward ultra-violet radiation and have a high specific gravity (significant advantage in case of underwater installation).

The non-woven textile materials employed according to the invention preferably have the mechanically consolidated structure of staple fiber batts. The crimped fibers are assembled to form a sheet structure with a maze of interstices. This ideally imitates the structure of the soil. The structure of the non-woven textile materials can be made coarser or finer, depending on the nature of the soil, so that optimum adaption to the type of soil at the site of use is warranted. The mechanical consolidation ensures a high friction coefficient between the soil and the non-woven textile material and the covering material. Instead of the non-woven textile fabrics consolidated mechanically by needling also non-woven textile fabrics can be employed which were consolidated mechanically by stitchbonding or by swirling, or which were chemically bonded.

The non-woven textile materials include, for example, materials listed in the following Tables 1 and 2.

TABLE 1

| Type | D 455 R | D 615 R | D 815 R |
|---|---|---|---|
| Fiber Raw Material | 100% HDPE | 100% HDPE | 100% HDPE |
| Sheet Weight (g/m$^2$) | 450 | 600 | 800 |
| Thickness (mm) at 2 kN/m$^2$ | 4,3 | 4,4 | 4,7 |
| Maximum Tensile Strength DIN 53 857 (Strip Drawing Test) (Length/Width) (daN/10 cm) | 54/66 | 80/102 | 84/120 |
| Elongation at Break DIN 53 857 (Length/Width) (%) | 230/193 | 247/198 | 300/200 |
| Deformation at Indenter Piercing Force DIN 54 307 (%) | 123 | 116 | 110 |
| Interstitial Width (mm) | 0.13 | 0,09 | 0,08 |
| Water Permeability (m/a) at 2 kN/m$^2$ without Soil Contact | $7,7 \cdot 10^{-3}$ | $4,6 \cdot 10^{-3}$ | $4,5 \cdot 10^{-3}$ |
| Cone Dropping Test (Piercing Test) Hole Diameter (mm) | 15 | 9 | 8 |
| Standard Width (m)/Length (m) | 4,40/100 | 4,40/50 | 4,40/50 |

TABLE 2

| | | Double Layer Composite Batt | | |
|---|---|---|---|---|
| | | Filter Layer mechanically consolidated non-woven sheet material consisting of PES staple fibers | Total | Drain Layer mechanically consolidated and chemically bonded non-woven sheet material of coarse PP fibers |
| Sheet Weight | g/m$^2$ | 250 | 1000 | 750 |
| Thickness (DIN 53855) | mm | 3,0 | 14 | 11,0 |
| Load Bearing Limit | | | | |
| Maximum Tensile Strength DIN 53 857 | kN/m | | 7 | |
| Elongation at Break | % | | 45 | |
| Effective Interstitial Width | mm | 0,09 corresponds to pore width of medium sand ($d_{50} \sim 0,4$ mm) | | 1,34 corresponds to pore width of medium gravel ($d_{50} \sim 6$ mm) |
| Water Permeability (k-value) vertical | kN/m | $1,8 \cdot 10^{-2}$ at 2 kN/m$^2$ to $1,8 \cdot 10^{-3}$ at 200 kN/m$^2$ weight bearing capacity (k values determine flow to drain layer; correspond approximately to the values for coarse sand) | | |
| Water Permeability, planar (Drain Effect) | | Information about dimensioning available upon request | | |

The interlayer of swellable clay preferably consists of bentonites. Bentonites are clays having an appreciably to high content of smectite (montmorillonite) which decisively determines the properties (high swellability, good water absorption capacity, high plasticity). In order to obtain from an alkaline earth metal bentonite having low swellability in water a highly swellable active bentonite the alkaline earth metal ions of the bentonites are replaced by alkali metal ions, preferably sodium ions. Therefore, sodium bentonite exhibiting highly increased plasticity, viscosity, thixotropy and water absorption is preferred for use according to the present invention.

The bentonite can be present in powdered and/or granulated form. The powdered form is preferred. Particularly preferred is sodium-activated bentonite which has such distribution of particle size that the major or predominant part of the particles have a size below 0.002 mm (2 microns).

Such a preferred sodium-activated bentonite has for example the following distribution of particle size:
>60 μm: 1,5%
60–40 μm: 2%
40–20 μm: 1,5%
20–10 μm: 2%
10–2 μm: 6%
<2 μm: 87%

The layer of swellable clay is substantially uniform. Depending on the particular application, the thickness of the said clay layer preferably ranges from 0.5 to 10.0 mm. However, it may also be smaller or greater, which depends on the employed clay, inter alia, also on the circumstances whether or not the substrate and/or cover layer was pretreated with ultrafinely divided bentonites, as described above, or for which purpose the sealing mat shall be used.

A preferred embodiment according to the invention is such a sealing mat wherein (a) the substrate layer and the cover layer consist of non-woven textile materials, (b) the non-woven textile materials have an area weight of about 250 to about 1000 g/m$^2$, a thickness of about 2 to about 8 mm, effective opening sizes between about 0.08 and about 1.5 mm, water permeabilities at a load of 2 kN/m$^2$ between about $10^{-3}$ and about $10^{-2}$ m/s and are made of spinning fibers with a length of cut of about 60 to about 150 mm, (c) the fibers of the non-woven textile materials consist of high density polyethylene, polypropylene or polyester,
(d) the swellable clay is a powdered sodium-activated bentonite and has such distribution of particle size that the major or predominant part of the particles have a size below 0.002 mm (2 microns).
(e) the thickness of the uniform bentonite layer is about 0.5 to about 10 mm,
(f) about 30 to about 50% of the employed bentonite is located in the substrate layer and in the cover layer.

The substrate layer can consist of two non-woven textile materials needled together, whereof the one non-woven material has very fine pores and the non-woven material associated with the bentonite layer has coarse pores. In this case the coarse-pored non-woven textile material (upper limit $D_w = 1.5$ mm) can be filled up to 100% with bentonite.

The production of the sealing mat according to the invention is carried out such that first the interlayer of dry, swellable clay is applied onto the substrate layer and thereon the cover layer is placed, whereafter all three layers are needled in a needle loom.

Moreover, the sealing mats according to the invention can also be prepared by first applying, in the manufacture thereof, a powdery bentonite on the substrate layer and distributing it by vibration, and thereafter applying the bentonite. Instead of the distribution of the powdery bentonite by vibration into the substrate layer the substrate layer can also be first impregnated with an aqueous bentonite suspension, or an aqueous bentonite paste can be rolled onto the substrate layer, whereafter—optionally after previous drying—the bentonite layer is applied. If desired, the cover layer can be treated like the substrate layer in the manner described above before being placed on the interlayer.

Needling of the three layers on the needle loom provides the desired strong mechanical coherence of the three layers of the sealing mat according to the invention. In addition thereto, further essential advantages are thereby attained. Even without the previous pretreatment of substrate and/or cover layer described above, needling at the inner surface facing the bentonite interlayer and the zones of the non-woven textile materials disposed there-beneath effects intensive mixing of fibers and bentonite. Moreover, as the bentonite swells when moistened, the strong needling bond provides a pressure counteracting the swelling pressure which, in combination with the above described intensive mixing of fibers and bentonite, warrants water impermeability of the sealing mats of the invention. Furthermore, needling ensures flexibility of the sealing mats to a degree that comes close to the goodpliability properties of mechanically consolidated non-woven textile materials.

The needling treatment results further in a contiguous fiber bond between substrate and cover layers.

The substrate and the cover layer are in such a way bonded together by needling so that shifting, i.e. pushing force, e.g. on slopes, can be transmitted by the cover layer via the fiber composite to the substrate layer. Without this fiber composite extending all through the bentonite layer the bentonite layer—especially in swelled condition—forms a preferred sliding path on slopes. After swelling of the clay and increase of the sealing mat thickness the coherence between supporting and cover layers effected by needling remains intact (in order to warrant the transmission of thrust). The result is a fiber-reinforced bentonite layer. Besides thrust reinforcement, the bentonite is locked in the fiber texture.

The impermeable sealing mats of the invention are used especially in hydraulic engineering and waste disposal engineering.

The present invention will now be explained with reference to FIGS. 1 and 2 and the following examples, without being restricted thereto.

FIG. 1 shows in cross section a part of the sealing mat 1 according to the invention;

FIG. 2 shows schematically a longitudinal section along the continuous production line resulting in the water impermeable sealing mat 1 according to the invention.

From a supply bin 6 the bentonite is applied as bentonite interlayer 3 onto the substrate layer 2 (non-woven textile material) wound off a supply reel, not shown. Thereafter the cover layer 4 (also a non-woven textile material) likewise wound off a supply reel, not shown, is placed on the bentonite interlayer 3. The thus obtained sheet structure composed of three layers is passed through a needle loom 7 in which all three layers are needled in a manner known per se. Depending on the thickness of the bentonite interlayer 3 the needled sheet structure representing the water impermeable sealing mat is wound on reels or is cut into the particular lengths desired for the contemplated use.

After having been laid out on large areas at the site of use the thus manufactured sealing mats can be fused together or sewn together along the abutting rims to allow also along the abutting edges the bentonite interlayer to merge and form a coherent water-impermeable interlayer upon swelling. Water-tight overlapping is also achieved by inserting between the overlapping regions a bentonite bead and then compressing said regions.

EXAMPLE 1

To make a sealing mat for hydraulic engineering a non-woven textile material 1004 R is used as supporting layer 2, and a non-woven textile material 201-3 is used as cover layer 4 with the characteristics listed hereafter:

TABLE 3

| Type | 1004 R | 201-3 |
|---|---|---|
| Fiber Raw Material | PES/PP | PES |
| Sheet Weight (g/m$^2$) | 814 | 225 |
| Thickness (mm) at 2 kN/m$^2$ | 6,6 | 2,8 |
| Maximum Tensile Strength DIN 53 857 (Strip Drawing Test) (Length/Width) (daN/10 cm) | 149/341 | 95/140 |
| Elongation at Break DIN 53 857 (Length/Width) (%) | 111/49 | 65/60 |
| Deformation at Indenter Piercing force DIN 54 307 (%) | — | — |
| Interstitial Width (mm) | 0,08 | 0.09 |
| Water Permeability (m/s) without Soil Contact at 2 kN/m$^2$ | $4,9 \cdot 10^{-3}$ | $6,0 \cdot 10^{-5}$ |
| Cone Dropping Test (Piercing Test) Hole Diameter (mm) | — | 16 |
| Standard Width (m)/ Length (m) | 4,80 × 100 | 4,75 × 100 |

The non-woven material, Type 1004 R, is a hydraulic engineering mat that has been in use for years and proved to be serviceable. The production width is usually 4.80 m. It constitutes a composite material composed of two layers of non-woven textile fabric, namely a filter layer of polyester (PES; about 70% of the total weight) and a coarse fiber layer of polypropylene fibers (about 30%1 of the total weight). The fibers are consolidated purely mechanically by needling. This two-layer composite non-woven material serving as substrate layer 2 has a sheet thickness greater than 6.0 mm.

The non-woven textile fabric 201-3 is a single-layer material made up of 100% polyester fibers. As will be seen from the preceding table, the sheet weigth is about 225 g/m² and the sheet thickness is about 2.8 mm. The production width normally is also 4.80 m.

The bentonite interlayer 4 consists of an activated sodium bentonite applied in an amount of about 2500 g/m², which corresponds to a layer thickness of about 1 to 2 mm.

The mat is manufactured in the following way:

A roll of non-woven textile material 1004 R is wound off a reel and is guided to a needling loom 7 as substrate layer 2. While the web is unwound a weighed quantity of dry bentonite having a particle size of a few millimeters is applied onto the substrate layer 2. At the same time a roll of non-woven textile material 201-3 is fed via a further reel to the bentonite interlayer 3 as cover layer 4. These three layers then pass through the needle loom 7 where they are mechanically firmly bonded together.

The needle loom 7 has one or more needle boards. Each needle board is provided with thousands of needles. The needle boards are moved rapidly up and down (up to about 1000 strokes per minute). The needless provided with barbs pierce the layers of non-woven fabric material 2, 4 and the bentonite interlayer 3, and the barbs take care that the individual fibers are interlaced to form a firm structure. Since the needling operation is not free of vibrations, a portion of the applied bentonite enters into the fiber batts, especially into the pores of the coarse fiber batt of the substrate layer 2 facing the bentonite interlayer 3.

The sealing mat obtained downstream of the needling loom 7 is wound on a reel and is transported to the site of use where it performs the function of a water impermeable sealing mat after having been laid out and moistened.

EXAMPLE 2

For the manufacture of a water impermeable sealing mat for use in waste disposal engineering the non-woven textile materials specified in Table 1 consisting of high density polyethylene fibers are used for the substrate 2 and for the cover layer 4. Substrate layer 2 and cover layer 4 may be the same or different.

EXAMPLE 3

In this example a sealing mat of the Type A is described for impermeable revetments on canals, reservoirs or dams with cover layers of rip-rap. The Type A sealing mat consists of a heavy carrier geotextile which is being produced according to the specifications of the Bundesanstalt für Wasserbau (Federal Institute for Waterway Engineering) as a geotextile filter for soil type 4. Type A can be covered directly with heavy stones.

The properties of Type A sealing mat are as follows:

| substrate layer: | double-layered |
|---|---|

| | -continued |
|---|---|
| | non-woven textile material Terrafix 1004 R of PES/PP fibers |
| Cover layer: | single-layered non-woven textile material 300 g/m² of PES fibers |
| Intermediate layer: | Bentonite B4 |
| Area weight (g/m²): | approx. 4100 |
| Max. tensile strength (N/10 cm) | |
| longitudinal: | >1600 |
| transverse: | >2500 |
| Elongation at max. tensile strength (%) | |
| longitudinal: | 60 |
| transverse: | 50 |
| Thickness (mm) | 10 |
| $k_v$ value (m/s): | approx. $5.5 \times 10^{-10}$ |

EXAMPLE 4

In this example a sealing mat of the Type B is described for sealings in cultural landscaping (ponds, storage basins, roads in catching areas for potable water), pond linings, etc. with cover layers of sand or gravel ballast. The Type B sealing is provided with a lighter carrier material. The cover layer can only consist of fine grained soils such as sand and gravel or crushed stones.

The properties of Type B sealing mat are as follows:

| Substrate layer: | single-layered non-woven textile material 300 g/m² of PES fibers |
|---|---|
| Cover layer: | single-layered non-woven textile material 300 g/m² of PES fibers |
| Intermediate layer: | Bentonite B4 |
| Area weight (g/m²): | approx. 3600 |
| Max. tensile strength (N/10 cm) | |
| longitudinal: | >1400 |
| transverse: | >2400 |
| Elongation at max. tensile strength (%) | |
| longitudinal: | 60 |
| transverse: | 50 |
| Thickness (mm) | 8 |
| $k_v$ value (m/s): | approx. $5.5 \times 10^{-10}$ |

EXAMPLE 5

In this example a sealing mat of the Type C is described for protection for synthetic membranes against coarse drainage material (e.g. gravel 16/32 mm) in refuse dumps. The Type C sealing mat makes use of the known high chemical resistance of high density polyethylene (PEHD). Thus, Type C can also be used in refuse dumps or similar highly aggressive environments. Designed as a protection layer for synthetic linings, the Bentonite Impervious Mat with a permeability coefficient of $k_v$ approx. $10^{-10}$ m/s forms an additional impermeable water barrier which reduces possible leakages and protects the membrane against direct contact with encrusted drainage layers.

The properties of Type C sealing mat are as follows:

| Substrate layer: | single-layered |
|---|---|

-continued

| | |
|---|---|
| | non-woven textile material 300 g/m² of PEHD fibers |
| Cover layer: | single-layered non-woven textile material 450 g/m² of PES fibers |
| Intermediate layer: | Bentonite B4 |
| Area weight (g/m²): | approx. 3600 |
| Max. tensile strength (N/10 cm) | |
| longitudinal: | >1400 |
| transverse: | >2400 |
| Elongation at max. tensile strength (%) | |
| longitudinal: | 60 |
| transverse: | 50 |
| Thickness (mm) | 8 |
| $k_v$ value (m/s): | approx. $5.5 \times 10^{-10}$ |

What is claimed is:

1. A water and/or oil-impermeable sealing mat for use as a water and/or oil barrier consisting essentially of, in order, a substrate layer, a layer of swellable clay, and a cover layer, wherein
   (a) at least one of the substrate and the cover layer consist of a non-woven textile material,
   (b) all three layers are bonded together by needling,
   (c) the swellable clay is at least partially embedded in a non-woven textile layer and
   (d) the thickness of the swellable clay is less than or substantially equal to the thickness of the non-woven textile layer or layers as a whole.

2. Sealing mat according to claim 1, wherein the non-woven textile material or materials have an area weight of about 250 to about 1000 g/m², a thickness of about 2 to about 8 mm, effective opening sizes between about 0.08 and about 1.5 mm, water permeabilities at a load of 2 kN/m² between about $10^{-3}$ and about $10^{-2}$ m/s and are made of spinning fibers with a length of cut of about 60 to about 150 mm.

3. Sealing mat according to claim 2, wherein one of the substrate and cover layer is a non-woven textile material and the other layer is a woven or knitted fabric, both of said substrate and cover layer consist of non-rotting synthetic resin fibers or filaments.

4. Sealing mat according to claim 3, wherein the fibers and/or filaments consist of polyolefin or polyester.

5. Sealing mat according to claim 4, wherein the polyolefin is polypropylene.

6. Sealing mat according to claim 4, wherein the polyolefin is high density polyethylene (HDPE).

7. Sealing mat according to claim 1, wherein the layer of swellable clay is uniform and has a thickness of about 0.5 to about 10 mm and the swellable clay is powdered or granular.

8. Sealing mat according to claim 1, wherein the swellable clay is bentonite.

9. Sealing mat according to claim 8, wherein the bentonite is an alkalimetal-activated bentonite.

10. Sealing mat according to claim 9, wherein the alkalimetal-activated bentonite is a sodium-activated bentonite.

11. Sealing mat according to claim 10, wherein the sodium-activated bentonite is powdered and has such distribution of particle size that the major or predominant part of the particles have a size below 0.002 mm (2 microns).

12. Sealing mat according to claim 11, wherein about 30 to about 50% of the employed bentonite is located in at least one of the substrate and/or the cover layer.

13. Sealing mat according to claim 1, wherein
    (a) the substrate layer and the cover layer consist of non-woven textile materials,
    (b) the non-woven textile materials have an area weight of about 250 to about 1000 g/m², a thickness of about 2 to about 8 mm, effective opening sizes between about 0.08 and about 1.5 mm, water permeabilities at a load of 2 kN/m² between about $10^{-3}$ m/s and are made of spinning fibers with a length of cut of about 60 to about 150 mm,
    (c) the fibers of the non-woven textile materials consist of high density polyethylene, polypropylene or polyester,
    (d) the swellable clay is a powdered sodium-activated bentonite and has such distribution of particle size that the major or predominant part of the particles have a size below 0.002 mm (2 microns).
    (e) the thickness of the uniform bentonite layer is about 0.5 to about 10 mm.
    (f) about 30 to about 50% of the employed bentonite is located in the substrate layer and in the cover layer.

* * * * *